(12) United States Patent
Kalis et al.

(10) Patent No.: US 8,481,190 B2
(45) Date of Patent: Jul. 9, 2013

(54) METHOD, APPARATUS, AND SYSTEM FOR MOUNTING AN ELECTRONIC DEVICE

(75) Inventors: Robert M. Kalis, Overland Park, KS (US); Jason D. Bridges, Lenexa, KS (US); David F. Lammers-Meis, Olathe, KS (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 13/476,798

(22) Filed: May 21, 2012

(65) Prior Publication Data

US 2012/0231312 A1 Sep. 13, 2012

Related U.S. Application Data

(63) Continuation of application No. 11/874,236, filed on Oct. 18, 2007, now abandoned.

(51) Int. Cl.
*H01M 2/02* (2006.01)
(52) U.S. Cl.
USPC .......................................................... 429/100
(58) Field of Classification Search
USPC .............................. 429/96–100; 224/163, 902
See application file for complete search history.

(56) References Cited

U.S. PATENT DOCUMENTS

| | | | |
|---|---|---|---|
| 5,664,292 A * | 9/1997 | Chen | 24/3.11 |
| 5,906,031 A | 5/1999 | Jensen | 24/3.12 |
| 5,933,330 A | 8/1999 | Beutler et al. | 361/814 |
| 6,695,269 B1 | 2/2004 | Anscher | 248/225.11 |
| 6,955,279 B1 | 10/2005 | Mudd et al. | 224/197 |
| 7,079,875 B2 | 7/2006 | Robertson, Jr. | 455/575.1 |
| 2003/0106919 A1 | 6/2003 | Chuang | 224/420 |
| 2006/0237494 A1 | 10/2006 | Fichera | 224/197 |

FOREIGN PATENT DOCUMENTS

| | | |
|---|---|---|
| JP | 05-267858 | 10/1993 |
| JP | 2002-051126 | 2/2002 |
| KR | 10-2007-0071940 | 7/2007 |

OTHER PUBLICATIONS

International Search Report from corresponding International Application No. PCT/US2008/068131, dated Dec. 23, 2008.
Garmin Rino® 120 Owner's Manual, Cover page, Copyright page, pp. 2-3, Mar. 2006.
Motorola Talkabout® User's Guide for Models T500, T5500, and T5550, Cover page, Copyright page, p. 15, 2004.
Printout from http://www.discountcell.com/cellular/p/moTalkabout_108_8 , 1 page, published prior to Oct. 18, 2007.
Printout from http://www.alternativewireless.com/rugged-cell-phone-cases/rugged-equipment-quad-lock.html , 2 pages, published prior to Oct. 18, 2007.

* cited by examiner

*Primary Examiner* — Maria J Laios
(74) *Attorney, Agent, or Firm* — Samuel M. Korte; Mohammad M. Ali

(57) ABSTRACT

A battery cover for an electronic device including a battery receptacle. The battery cover generally comprises a base and a cover mating element. The base is operable to couple with a portion of the electronic device and at least partially cover the battery receptacle. The cover mating element is operable to couple with the base and interchangeably mate with a reciprocal mating element associated with a mount to couple the electronic device to the mount.

9 Claims, 9 Drawing Sheets

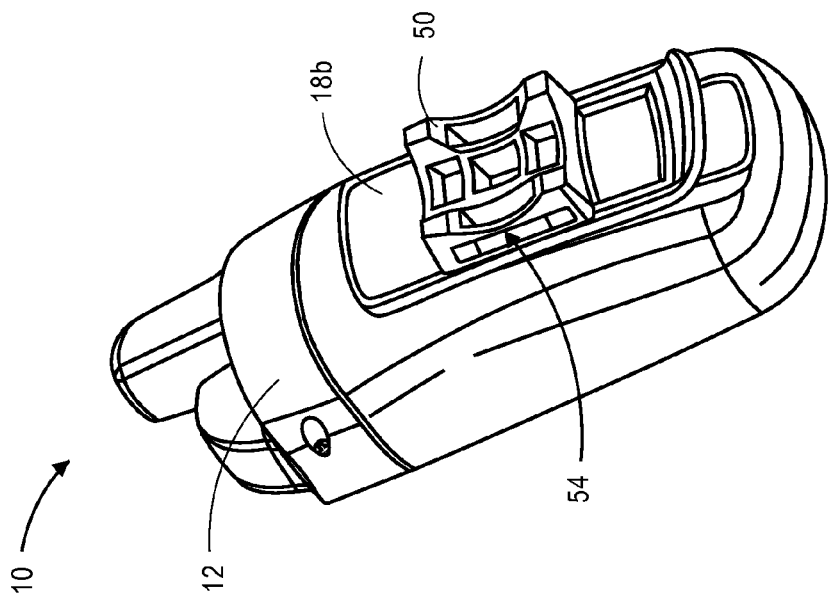
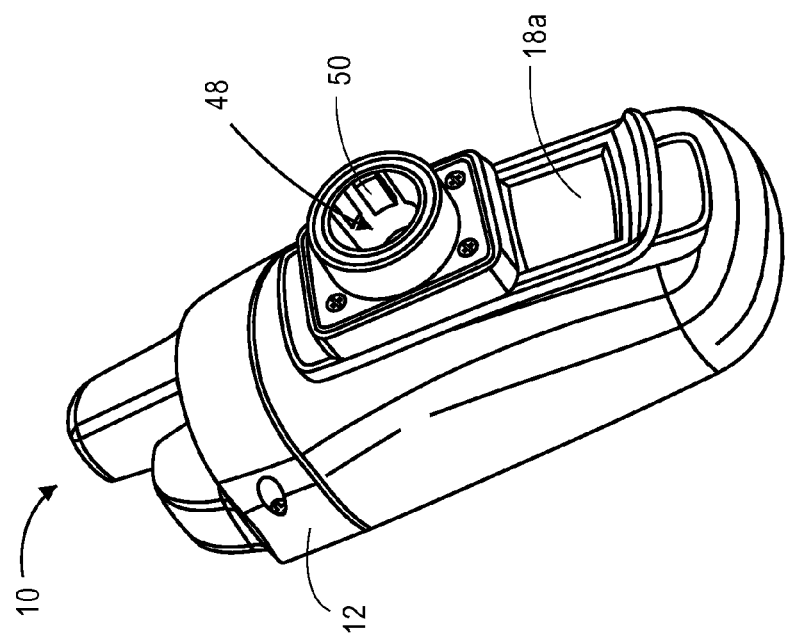

METHOD, APPARATUS, AND SYSTEM FOR MOUNTING AN ELECTRONIC DEVICE

RELATED APPLICATIONS

The present application is a continuation of, and claims priority benefit to, co-pending and commonly assigned U.S. patent application entitled "METHOD, APPARATUS, AND SYSTEM FOR MOUNTING AN ELECTRONIC DEVICE UTILIZING A BATTERY COVER," application Ser. No. 11/874,236, filed Oct. 18, 2007, which is herein incorporated by reference in its entirety.

BACKGROUND

1. Field

Embodiments of the present invention relate to the mounting of electronic devices. More particularly, various embodiments of the invention provide methods, apparatuses, and systems for mounting an electronic device utilizing a battery cover associated with the electronic device.

2. Description of the Related Art

Electronic devices, such as personal navigation devices, may be mounted in various environments including automobile, motorcycle, or bicycle environments to facilitate their use and enjoyment. Electronic devices often are configured for mounting utilizing only one mounting configuration. For example, an electronic device configured for mounting using a ball and socket configuration may be unable to mount with mounting devices that employ other configurations. Thus, users are often unable to employ electronic devices in a plurality of mounting configurations.

SUMMARY

Embodiments of the present invention provide a distinct advance in the art of electronic device mounting. More particularly, various embodiments of the invention provide methods, apparatuses, and systems for mounting an electronic device utilizing a battery cover associated with the electronic device.

In various embodiments, the present invention provides a battery cover for an electronic device including a battery receptacle. The battery cover generally comprises a base and a cover mating element. The base is operable to couple with a portion of the electronic device and at least partially cover the battery receptacle. The cover mating element is operable to couple with the base and interchangeably mate with a reciprocal mating element associated with a mount to couple the electronic device to the mount. In some embodiments, the cover mating element may be operable to interchangeably mate with a plurality of reciprocal mating elements associated with a plurality of mounts to enable the electronic device to be coupled to any one of the mounts.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Various embodiments of the present invention are described in detail below with reference to the attached drawing figures, wherein:

FIG. 9 is a perspective view of the electronic device and battery cover of FIG. 6 coupled with a first exemplary reciprocal mating element; and FIG. 10 is a perspective view of the electronic device and battery cover of FIG. 6 coupled with a second exemplary reciprocal mating element;

Figure 1:
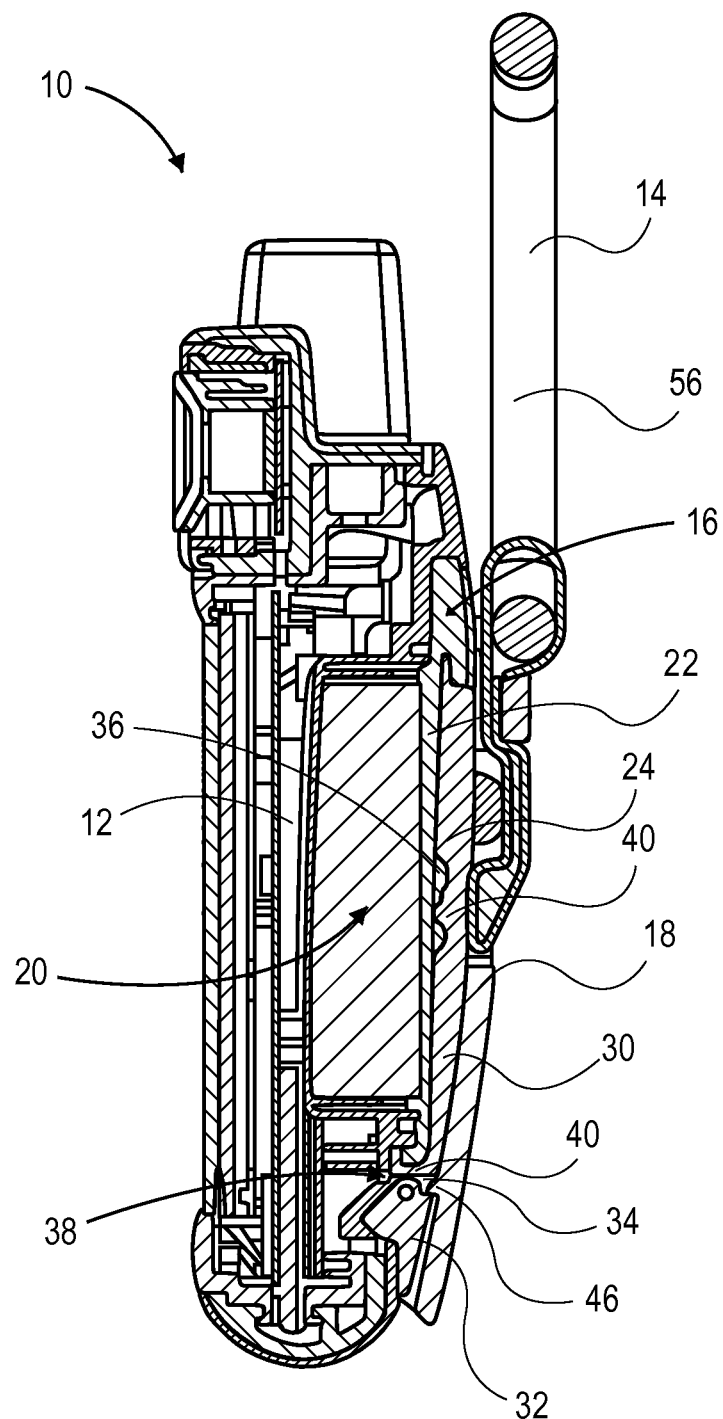
FIG. 1 is a sectional view of a battery cover and mount utilized by embodiments of the present invention to couple with an electronic device.

The drawing figures do not limit the present invention to the specific embodiments disclosed and described herein. The drawings are not necessarily to scale, emphasis instead being placed upon clearly illustrating various embodiments of the invention.

DETAILED DESCRIPTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Various embodiments of the present invention provide a mounting system 10 for securing an electronic device 12 to one or more mounts 14. As illustrated in FIGS. 1 through 14, the mounting system 10 may broadly include a battery cover 16 and one or more reciprocal mating elements 18. The battery cover 16 is operable to at least partially cover a battery receptacle 20 associated with the electronic device 12 and mate with at least one of the reciprocal mating elements 18. The reciprocal mating elements 18 may each be associated with one or more of the mounts 14 to enable the electronic device 12 to be secured to one or more of the mounts 14 by mating the battery cover 16 with a selected one of the reciprocal mating elements 18. Such a configuration enables the electronic device 12 to be easily secured to the various mounts 14 even if the mounts 14 present varying mounting configurations.

The electronic device 12 may be any electronic device with the battery receptacle 20 or similar battery receptacle. In some embodiments, the electronic device 12 may be a personal navigation device such as those manufactured by Garmin®. However, the electronic device 12 is not so limited and may include devices such as computing devices, personal media players, personal entertainment devices, televisions, radios, electronic monitoring devices, cameras, combinations thereof, and the like. The electronic device 12 may include various electronic and functional features, including for example, electronic displays, antennas, processing and memory elements, user input elements, microphones, speakers, electrical connectors, combinations thereof, and the like.

Figure 3:
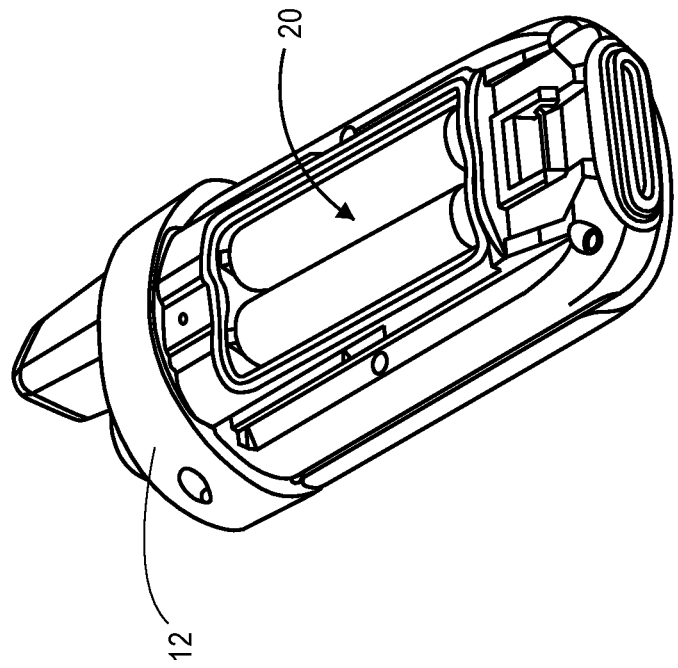
FIG. 3 is a perspective view of the electronic device of FIGS. 1-2 without the battery cover and mount coupled thereto.

The battery receptacle 20 associated with the electronic device 12 may be any receptacle operable to at least partially retain a power source such as one or more batteries. For example, as illustrated in FIG. 3, the battery receptacle 20 may be operable to retain battery elements presenting standard dimensions such as AA and AAA batteries and battery packs. However, as should be appreciated, the battery receptacle 20 may be operable to retain battery elements presenting any form or configuration. Further, in some embodiments, the battery receptacle 20 may retain a power source other than a battery. For example, the battery receptacle 20 may include any elements operable to retain or transfer power, including wires, conduits, sockets, combinations thereof, and the like.

The battery cover 16 may include any elements and present any configurations operable to couple with the electronic device 12 and mate with one or more of the reciprocal mating elements 18. In some embodiments, the battery cover 16 includes a base 22 and a cover mating element 24 coupled thereto.

The base 22 is operable to couple with a portion of the electronic device 12 and at least partially cover the battery receptacle 20. In some embodiments, the battery cover 16 may comprise a portion of the electronic device 12 such that the base 22 is operable to couple with another portion, such as a main body, of the electronic device 12. However, in other embodiments, the battery cover 16 and/or base 22 may be considered to be discrete from the electronic device 12. For example, the battery cover 16 may be sold and/or distributed separately from the electronic device 12 to enable users to replace the original battery cover associated with the electronic device 12 with the battery cover 16.

Figure 4:
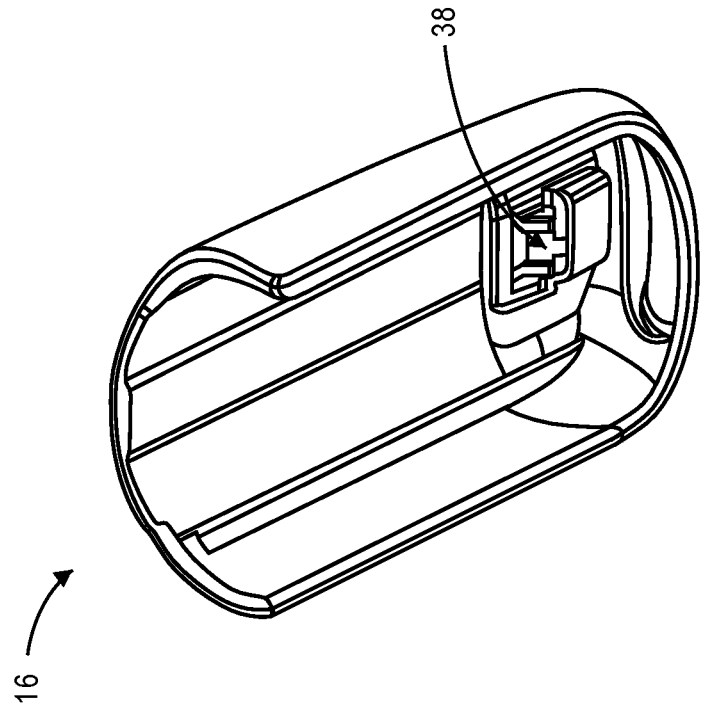
FIG. 4 is a perspective view of a battery cover operable to be utilized by various embodiments of the present invention.
Figure 5:
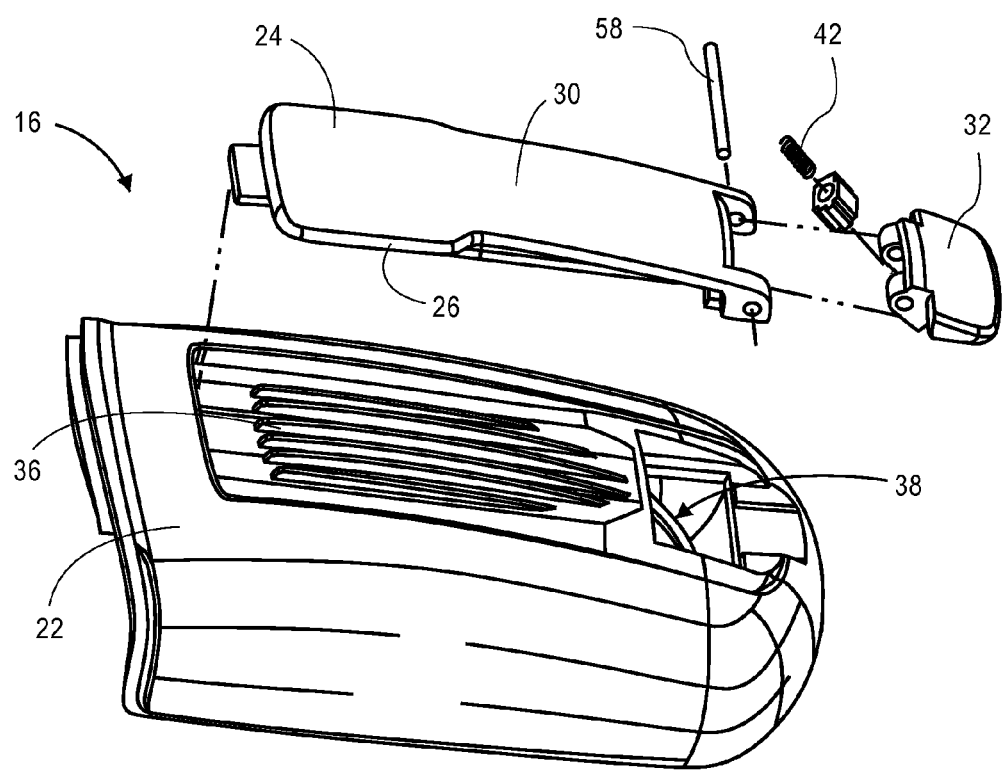
FIG. 5 is an exploded view of the battery cover of FIG. 4.

The base 22 may removably couple with the electronic device 12 utilizing various coupling elements such as screws, fasteners, latches, snaps, prongs, protrusions, slots, combinations thereof, and the like, to enable the power source retained by the battery receptacle 20 to be easily accessed and/or replaced. In some embodiments, as illustrated in FIGS. 3 through 5, the base 22 may be slidably coupled with a rear portion of the electronic device 12 by sliding along a recess formed within the electronic device 12. However, the base 22 may present any configuration operable to couple with any portion of the electronic device 12 and the battery receptacle 20, including battery door configurations.

The cover mating element 24 is operable to couple with the base 22 and interchangeably mate with one or more of the reciprocal mating elements 18 associated with the mounts 14. The cover mating element 24 may be integral or otherwise fixedly attached to the base 22. Thus, "operable to couple" as utilized herein includes configurations where the cover mating element 24 and base 22 are previously and/or permanently coupled together. However, in some embodiments, the cover mating element 24 may be discrete from the base 22 and operable to be coupled therewith during and/or after assembly of the mounting system 10.

Figure 2:
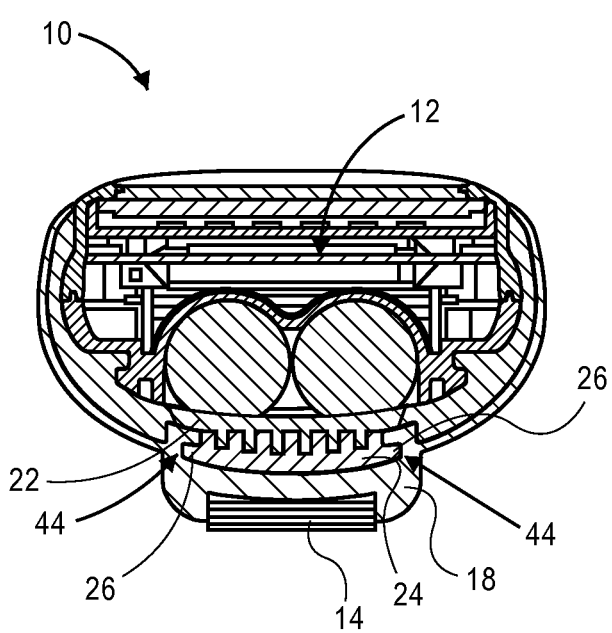
FIG. 2 is a cross sectional view of the battery cover, mount, and electronic device of FIG. 1.

In some embodiments, the cover mating element 24 presents a plurality of protrusions 26 which extend therefrom. As illustrated in FIG. 2, the protrusions 26 may extend from generally opposed sides of the cover mating element 24 to facilitate coupling with the reciprocal mating elements 18, as is discussed in more detail below. To facilitate slidable coupling of the battery cover 16 and reciprocal mating elements 18, the cover mating element 24 and protrusions 26 may present a generally T-shaped configuration where the base of the "T" is directly coupled to the base 22. The area between the base 22 and protrusions 26 may define a recess in which at least a portion of the reciprocal mating elements 18 may be received.

The protrusions 26 may extend substantially along the length of the cover mating element 24 to enable portions of the protrusions 26 to be easily received by the reciprocal mating elements 18. In some embodiments, the protrusions 26 may extend along only a portion of the cover mating element 24 to limit the length over which the cover mating element 24 and reciprocal mating elements 18 may be slidably coupled. The cover mating element 24 may include a stop that is positioned at a terminal end of the protrusions 26 to prevent the reciprocal mating elements 18 from sliding off the protrusions 26 after coupling.

In some embodiments, the cover mating element 24 may comprise a first portion 30, a second portion 32 hingedly coupled with the first portion 30, and a pocket portion 34 defined between the first and second portions 30, 32. As is discussed in more detail below, the pocket portion 34 may be operable to receive at least portions of one of the reciprocal mating elements 18 to facilitate coupling of the cover mating element 24 and reciprocal mating elements 18. Further, the portions 30, 32 are not necessarily hingedly coupled as in some embodiments the portions 30, 32 may be integrally formed and/or joined.

The first portion 30 may include the protrusions 26 discussed above and be directly coupled with the base 22 of the battery cover 16. The first portion 30 may be hingedly coupled with the second portion 32 at one of its terminal ends as is illustrated in FIG. 5. Thus, the first portion 30 and second portion 32 may cooperate to form a hinge about which the second portion 32 may at least partially pivot to define the pocket portion 34.

In some embodiments, as illustrated in FIG. 1, the base 22 may include one or more tabs 36 and a recess 38 that may be engaged by the first portion 30 to couple the first portion 30 and base 22 together without requiring the use of penetrating fastening elements that may affect the integrity of the base 22 and battery cover 16 and provide a leak path for water into the battery receptacle 20. The first portion 30 may include one or more contacts 40 that are operable to engage the tabs 36 and/or recess 38. For example, when the first portion 30 is slid against the base 22, the contacts 40 may engage the tabs 36 and recess 38 to quickly and securely affix the first portion 30 to the base 22 during and/or after initial assembly of the mounting system 10.

The second portion 32 may be hingedly coupled to the first portion 30 or integral with the first portion 30 as discussed above. The second portion 32 may be directly coupled to the first portion 30 and not directly coupled to the base 22 to enable the second portion 32 to pivot about the first portion 30 when the first portion 30 is securely affixed to the base 22. In some embodiments, the second portion 32 may present a tab-like configuration that presents a shorter length then the first portion 30 to facilitate pivoting.

The first and second portions 30, 32 of the cover mating element 24 may be formed of any material to enable coupling with one or more of the reciprocal mating elements 18. In some embodiments, the first and second portions 30, 32 may be formed of metal or other substantially durable materials to enable the battery cover 16 and one of the reciprocal mating elements 18 to remain mated even under adverse environmental and operational conditions. However, the first and second portion 30, 32 may additionally or alternatively be formed of plastic and other natural and synthetic materials.

The pocket portion 34 is defined by the gap formed between the first and second portions 30, 32 where the portions 30, 32 are hingedly coupled. In embodiments where the first and second portions 30, 32 are integral, the pocket portion 34 is defined by a detent and/or aperture formed within the integral portions 30, 32. The pocket portion 34 may present any dimension or configuration based upon the configuration of the first and second portions 30, 32. In some embodiments, the first and second portions 30, 32 may be positioned to substantially eliminate the pocket portion 34 such that upon pivoting of the second portion 32 the pocket portion 34 is created. Thus, one or more dimensions of the pocket portion 34 may be varied through movement of the second portion 32.

In some embodiments, as shown in FIG. 5, portions of the cover mating element 24 may be biased by a spring element 42 to facilitate proper definition of the pocket portion 34. For example, the spring element 42 may bias the second portion 32 to limit the area provided by the pocket portion 34. Upon application of a force to the second portion 32 and/or pocket portion 34, the second portion 32 may pivot against the force provided by the spring element 42 to release the battery cover 16 from the electronic device 12, as is discussed in more detail below.

A pivot pin 58 may be utilized in combination with the spring element 42 to hingedly couple the first portion 30 and second portion 32 together. In some embodiments, the pivot pin 58 may be operable for insertion into the first portion 30 such that when the first portion 30 is coupled with the base 22 the pivot pin 58 will be at least partially enveloped by the base 22. Such a configuration eliminates the need to utilize a conventional spring pin, which requires high pressure installation, and thus reduces the cost and complexity associated with the assembly of the battery cover 16.

The reciprocal mating elements 18 are each operable to couple with at least one of the mounts 14. In various embodiments, some of the reciprocal mating elements 18 may be integral with some of the mounts 14 while other reciprocal mating elements 18 may be operable to removably couple with some of the mounts 14. Each of the reciprocal mating elements 18 may present any configuration operable to interchangeably mate with the battery cover 16 and/or cover mating element 24.

In some embodiments, as shown in FIGS. 1, 2, and 7 through 10, each of the reciprocal mating elements 18 may interchangeably mate with the cover mating element 24 by engaging the protrusions 26. For example, each reciprocal mating element 18 may include grooves 44 that correspond to the protrusions 26 to enable slidable coupling with the cover mating element 24. As shown in FIG. 2, the grooves 44 may at least partially receive the protrusions 26 while positioning a portion of the reciprocal mating element 18 between the base 22 and cover mating element 24. Such a configuration enables the battery cover 16 to be securely and interchangeably coupled with the reciprocal mating elements 18 by allowing the mating elements 18, 24 to be detached through movement along only one direction.

In some embodiments, the protrusions 26 may be configured as grooves that include a protruding portion and the grooves 44 may be configured as protrusions that include a recess for receiving the protruding portions of the protrusions 26. For example, both the protrusions 26 and grooves 44 may be substantially "C" shaped for interlocking. As such, "protrusion" and "groove," as utilized herein, refers to any structural configuration where any part of the protrusion may be received in any part of the groove, or vice versa.

One or more of the reciprocal mating elements 18 may additionally or alternatively include a catch 46 operable to be at least partially received by the pocket portion 34 to couple the mating elements 18, 24 together. For example, as is discussed in more detail below, the catch 46 may be inserted into the pocket portion 34 to at least partially couple the mating elements 18, 24 together. Utilization of both the grooves 44 and catch 46 to mate the mating elements 18, 24 enables the mating elements 18, 24 to be easily and rapidly secured while preventing inadvertent decoupling, as discussed below in more detail. However, any of the reciprocal mating elements 18 may include any elements or present any configuration operable to interchangeably mate with the cover mating element 24.

In embodiments where one or more of the reciprocal mating elements 18 are not integral with the mounts 14, various reciprocal mating elements 18 may couple with selected mounts 14 by utilizing irremovable and removable mating elements such as fasteners, screws, clamps, clips, ball and socket joints, hook and loop fasteners, bolts, protrusions, straps, adhesives, combinations thereof, and the like.

The mounts 14 may include any elements or combination of elements operable to secure the electronic device 12 to one or more surfaces. In some embodiments, the mounts 14 may include an automobile mount, a motorcycle mount, a bicycle mount, a marine mount, a carrying case, and/or a carabineer mount. However, as should be appreciated, the mounts 14 may include any mount 14 operable to be associated with one or more of the reciprocal mating elements 18 and are not limited to the exemplary and/or illustrated mounts 14.

In some embodiments, at least one of the reciprocal mating elements 18 may include a socket mating element 18a, as is illustrated in FIG. 9. The socket mating element 18a may include a socket 48 and a plurality of retaining arms 50 to removably couple with a ball associated with a ball-arm mount, such as an automobile or motorcycle mount. Utilization of the socket 48 and retaining arms 50 enables the socket mating element 18a to securely couple with various ball-arm mounting devices in a manner that enables the electronic device 12 to be easily repositioned and/or reoriented after coupling with the mount 14.

In some embodiments, as illustrated in FIG. 10, at least one of the reciprocal mating elements 18 may include a cable mating element 18b that is operable to independently function as one or the mounts 14 and/or couple with one of the mounts 14. For example, the cable mating element 18b may present a curved mounting surface 52 and one or more cable apertures 54. The curved mounting surface 52 is operable to abut a curved surface, such as a bicycle handlebar stem or frame structure, and be securely affixed thereto utilizing a cable inserted through one or more of the cable apertures 54. The cable mating element 18b may be operable to abut any curved or non-curved surfaces and does not necessarily include the curved mounting surface 52 to couple with curved bicycle surfaces. For example, the cable mating element 18b may be utilized to secure the electronic device 12 to a user's wrist or forearm by abutting the cable mating element 18b against the user's wrist or forearm and securing the cable mating element 18b thereto utilizing a cable or other strap.

Figure 7:
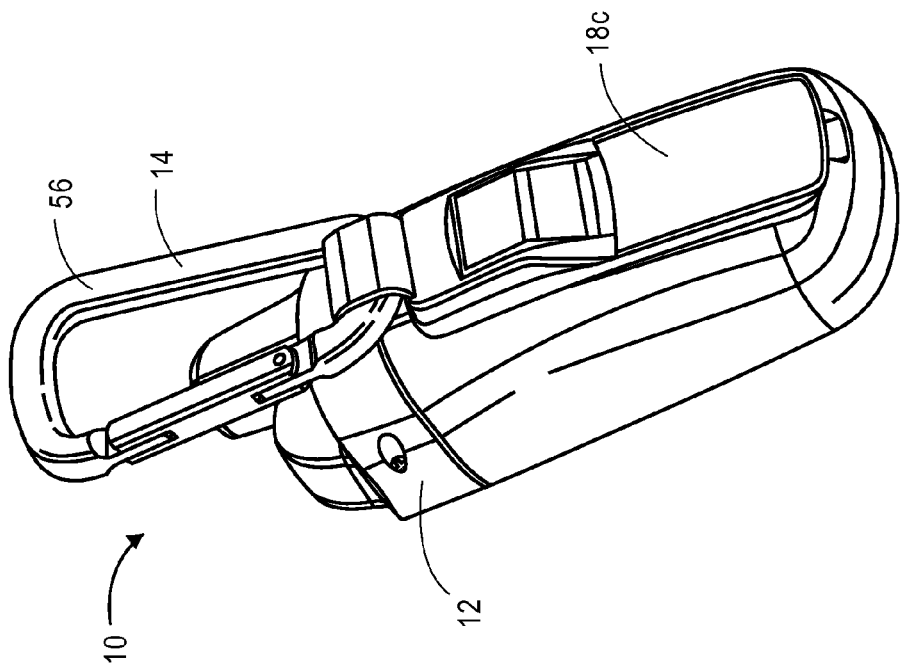
FIG. 7 is a perspective view of the electronic device and battery cover of FIG. 6 coupled with an exemplary carabineer mount.
Figure 8:
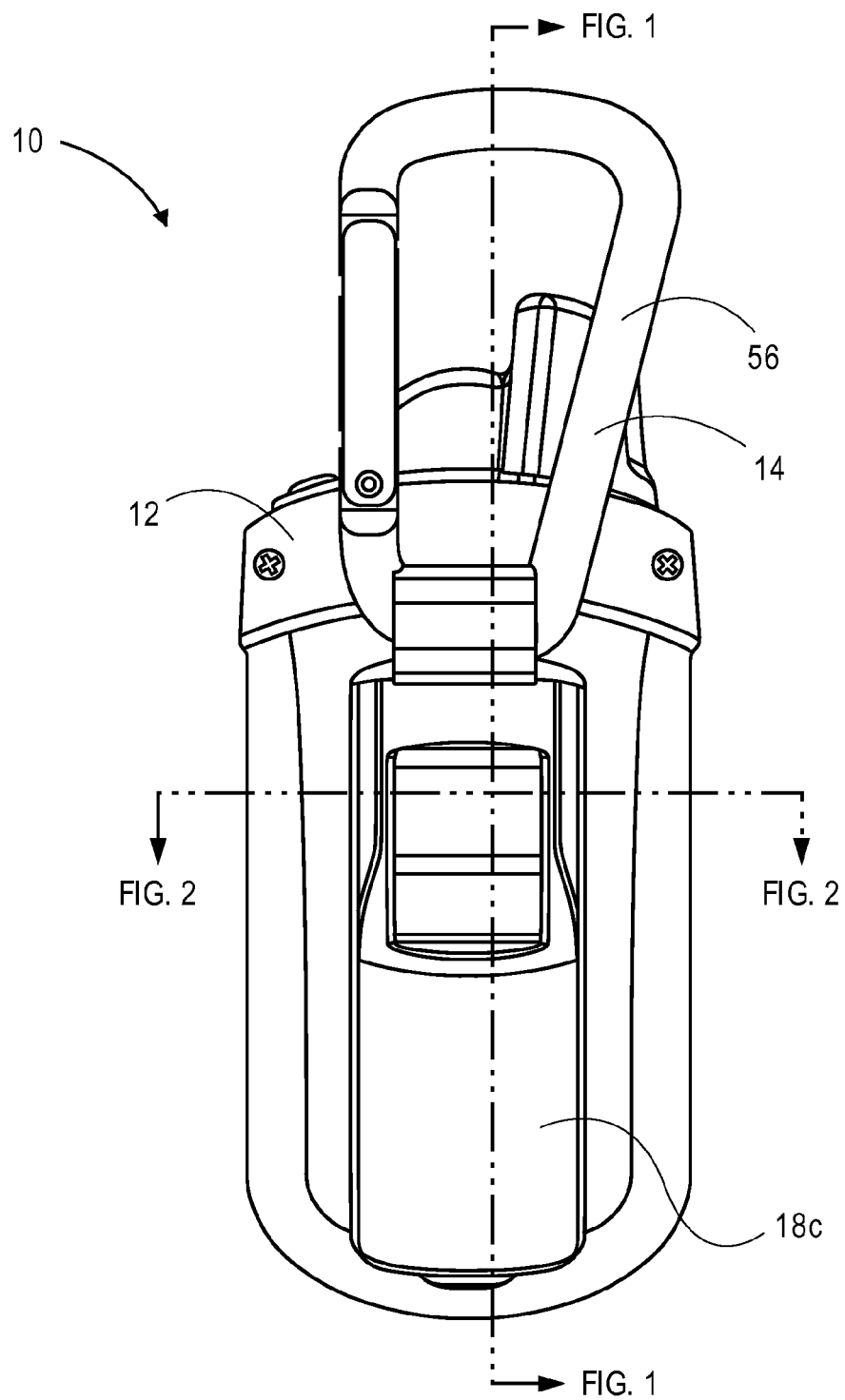
FIG. 8 is a front view of the electronic device and carabineer mount of FIG. 7.

In some embodiments, as illustrated in FIGS. 1, 7, and 8, at least one of the reciprocal mating elements 18 may include a carabineer mating element 18c that is operable to independently function as one or the mounts 14 and/or couple with one of the mounts 14. For example, the carabineer mating element 18c may include or be coupled with a carabineer 56 to enable the electronic device 12 to be easily secured to various surfaces, such as backpacks, garments and apparel including belt loops, vests, and tool belts, hiking equipment, camping equipment, sporting equipment, vehicles including automobiles, motorcycles, and bicycles, combinations thereof, and the like.

The carabineer 56 may be integral with the carabineer mating element 18c or operable for removable coupling therewith. For example, the carabineer mating element 18c may include a latching element to enable the carabineer 56 to be selectively coupled therewith or the carabineer 56 may be permanently affixed to the carabineer mating element 18c. The carabineer 56 may present a loop-type configuration including a sprung or screwed gate to easily and quickly couple with various surfaces. However, the carabineer 56 may include any mating, locking, or coupling elements and is not limited to conventional carabineer configurations.

Figure 12:
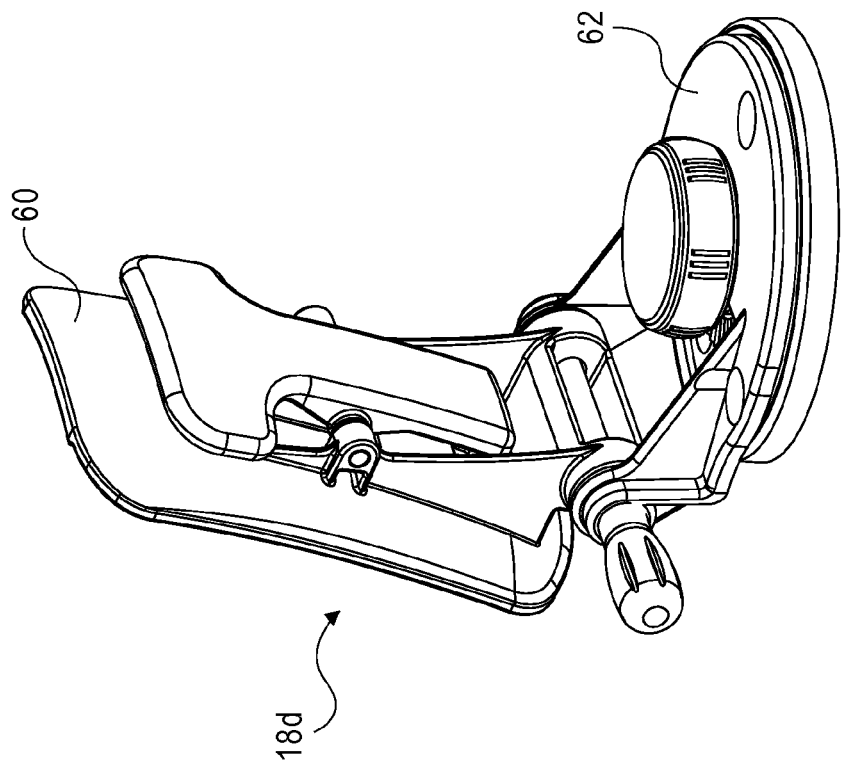
FIG. 12 is a rear perspective view of the third exemplary reciprocal mating element of FIG. 11.
Figure 11:
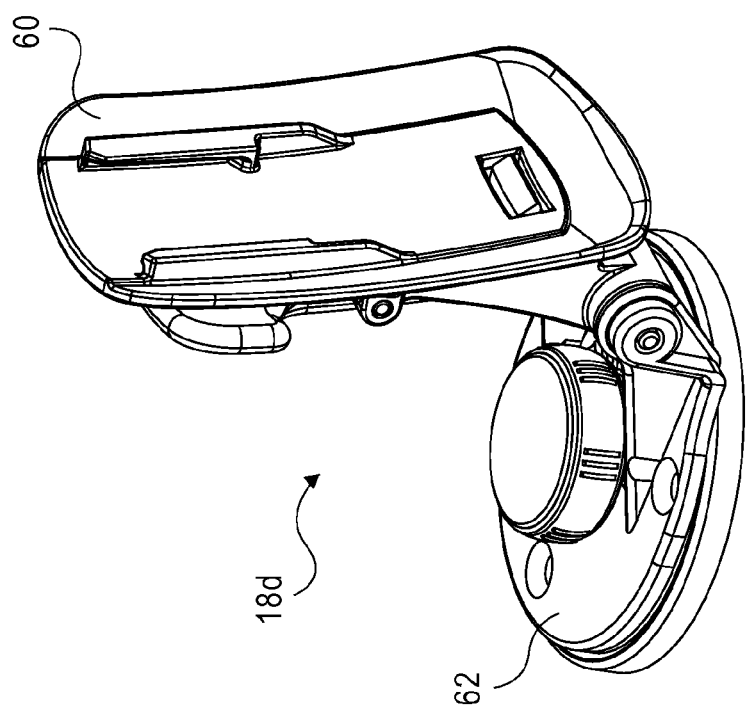
FIG. 11 is a front perspective view of a third exemplary reciprocal mating element operable to couple with the electronic device and battery cover of FIG. 6.

In some embodiments, as illustrated in FIGS. 11-12, at least one of the reciprocal mating elements 18 may include a marine mount mating element 18d that is operable to independently function as one or the mounts 14 and/or couple with one of the mounts 14. For example, the marine mount mating element 18d may function as one of the mounts 14 to enable the electronic device 12 to be easily secured to various marine-related surfaces, such as marine equipment panels and the like. The marine mount mating element 18d may also releasably couple with a marine mount to enable the electronic device 12 and marine mount mating element 18d to be easily detached from the marine mount.

The marine mount mating element 18d may include a backing support 60 including grooves 44 for interlocking with the protrusions 26 as discussed above. The backing support 60 may removably couple with a base 62 that is operable to couple with a marine-related surface. For example, the base 62 may include removable and/or permanent mating elements, such as suction cups, magnetic elements, hook and loop fasteners, adhesives, fasteners, combinations thereof, and the like, the enable the base 62 to couple with marine-related surfaces. In some embodiments, the backing support 60 may be integral with the base 62 and the marine mount mating element 18d and battery cover 16 may employ interlocking mating elements other than the protrusions 26 and grooves 44.

Figures 13, 14:
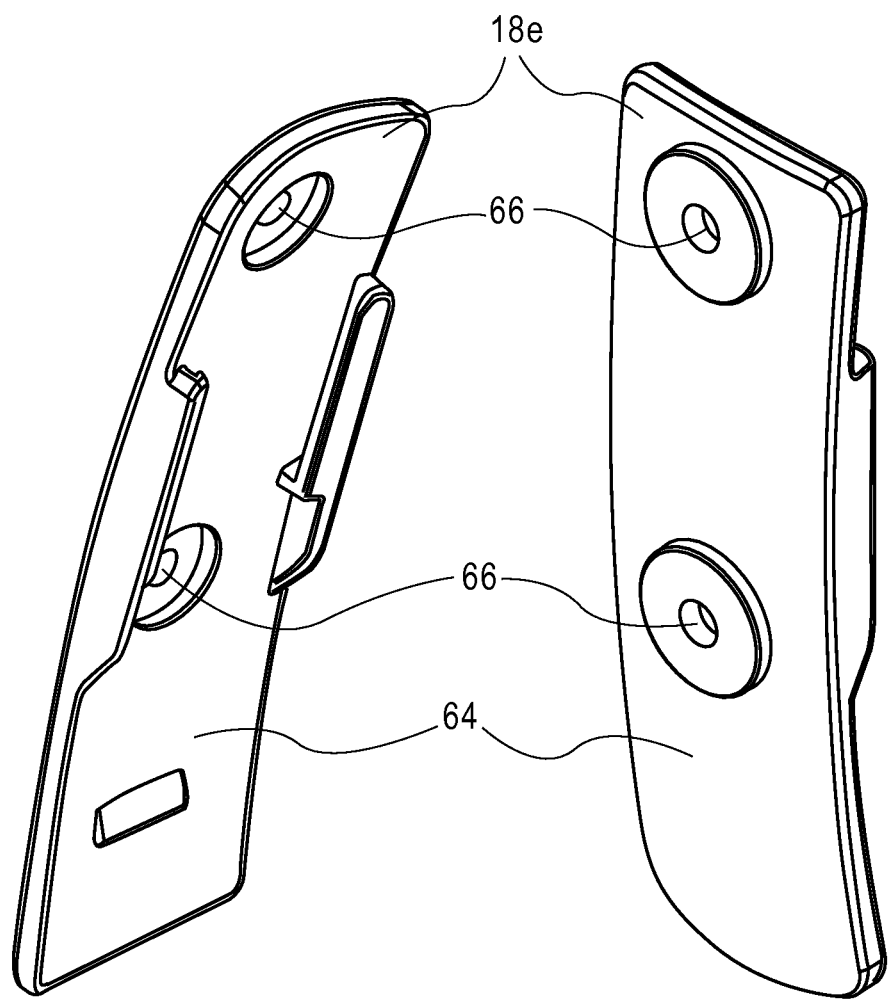
FIG. 13 is a front perspective view of a fourth exemplary reciprocal mating element operable to couple with the electronic device and battery cover of FIG. 6.
FIG. 14 is a rear perspective view of the fourth exemplary reciprocal mating element of FIG. 13.

In some embodiments, as illustrated in FIGS. 13-14, at least one of the reciprocal mating elements 18 may include a carrying case mating element 18e that is operable to independently function as one or the mounts 14 and/or couple with one of the mounts 14. For example, the carrying case mating element 18e may function as one of the mounts 14, such as by providing a carrying case for the electronic device 12, to which the electronic device 12 may be easily and securely attached by utilizing the reciprocal mating elements 18. The carrying case mating element 18e may also releasably couple with a carrying case mount to enable the electronic device 12 and carrying case mating element 18e to be easily detached from the carrying case.

The carrying case mating element 18e may include a clip 64 including grooves 44 for interlocking with the protrusions 26 as discussed above. The clip 64 may be inserted into a carrying case (not illustrated) to enable the electronic device to be easily carried. In some embodiments, the clip 64 may include one or more apertures 66 to enable the clip 64 to be securely coupled to the carrying case. For example, the apertures 66 may receive cables, snaps, hooks, latches, buttons, and/or the like associated with the carrying case to prevent the clip 64—and electronic device 12—from inadvertently detaching from the carrying case. Thus, the clip 64 ensures that the electronic device 12 will stay securely coupled with the carrying case until the user detaches the electronic device 12 by sliding the protrusions 26 away from the grooves 44. In some embodiments, the carrying case mating element 18e and battery cover 16 may employ reciprocal mating elements other than the protrusions 26 and grooves 44.

Figure 6:
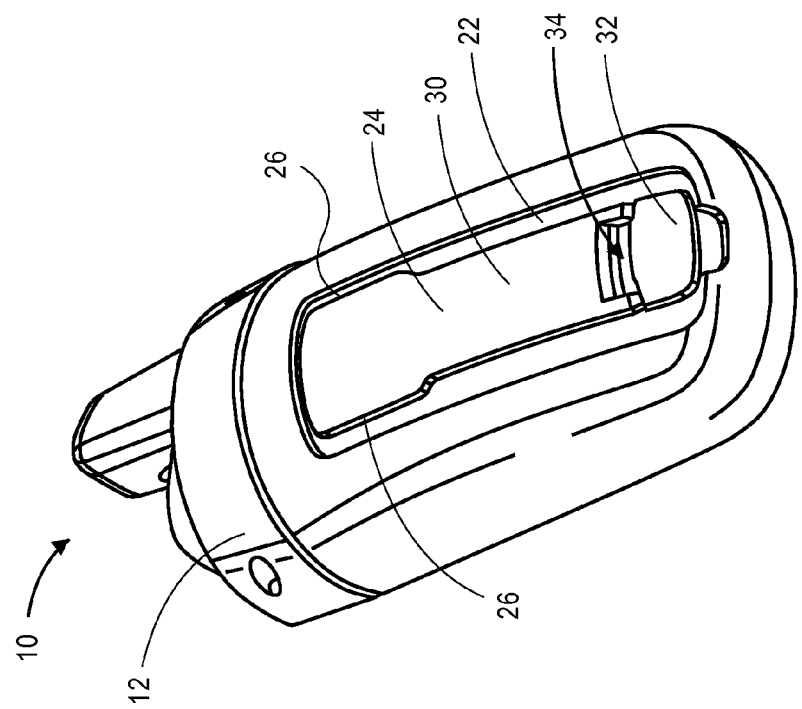
FIG. 6 is a perspective view of the electronic device of FIGS. 1-2 with the battery cover of FIGS. 4-5 coupled thereto.

In operation, the electronic device 12 may be utilized in various mounting configurations through the mating functionality provided by the battery cover 16. For example, the user may utilize the electronic device 12 in an unmounted configuration, as shown in FIG. 6, by coupling the electronic device 12 and battery cover 16 together without the use of the reciprocal mating elements 18. In such a configuration, the electronic device 12 may function as a handheld electronic device.

If the user desires to utilize the electronic device 12 within an automobile, the user may couple the battery cover 16 with a reciprocal mounting element associated with the automobile, such as the socket mating element 18a. Should the user desire to transfer the electronic device 12 from the automobile to a bicycle, the user may couple the battery cover 16 with a reciprocal mating element associated with the bicycle, such as the cable mating element 18b. Should the user then desire to transfer the electronic device 12 from the bicycle to a backpack, the user may decouple the battery cover 16 and cable mating element 18b and couple the battery cover 16 with a reciprocal mating element associated with the backpack, such as the carabineer mating element 18c.

In some embodiments, as discussed above, the user may mate the battery cover 16 with a selected one of the reciprocal mating elements 18 by utilizing the protrusions 26, pocket portion 34, grooves 44, and/or catch 46. For example, the user may slide the grooves 44 of one of the reciprocal mating elements 18 around the protrusions 26 and slide the selected reciprocal mating element 18 upward until the catch 46 is received by the pocket portion 34 to securely couple the battery cover 16 to the selected reciprocal mating element 18. To uncouple the battery cover 16 with the selected reciprocal mating element 18, the user may lift the portion of the reciprocal mating element 18 associated with the catch 46 away from the pocket portion 34 and slide the reciprocal mating element 18 downward to enable a different reciprocal mating element 18 to be coupled with the battery cover 16.

Thus, the user may easily mount and utilize the electronic device 12 in various mounting configurations by coupling the battery cover 16 with the various reciprocal mating elements 18 while not being required to manually reconfigure the battery cover 16 or electronic device 12 between mounting configurations. Further, utilization of the battery cover 16 for coupling with the reciprocal mating elements 18 may enable the various electronic and functional features of the electronic device 12, such as the display and user input elements, to remain unimpeded by the mating functionality provided by the cover mating element 24.

Portions of the second portion 32 may be retained within a detent associated with the electronic device 12 to secure the battery cover 16 to the electronic device 12. To remove the battery cover 16, the user may apply force to the second portion 32, against the biasing provided by the spring element 42, to decouple the second portion 32 from the detent and allow the removal of the battery cover 16 from the electronic device 12. In some embodiments, portions of one or more of the reciprocal mating elements 18 may at least partially cover the second portion 32 when joined, as is illustrated in FIGS. 7-10, to prevent movement of the second portion 32, and associated removal of the battery cover 16, when the electronic device 12 is secured to one of the mounts 14. Such a configuration enables the mounting system 10 be utilized with the mounts 14 in environments where the electronic device 12 may be exposed to significant forces and accelerations, without having the battery cover 16—and attached mount 14—accidentally decouple from the electronic device 12.

It is believed that embodiments of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A battery cover for an electronic device including a battery receptacle, the battery cover comprising:
    a base operable to couple with a portion of the electronic device and at least partially cover the battery receptacle; and
    a cover mating element including a pair of opposed protrusions, the cover mating element positioned on the base to define opposed recesses between the base and each of the protrusions, the protrusions extending outwardly away from a longitudinal axis of the cover mating element;
    wherein the cover mating element is operable to be slidably coupled with a reciprocal mating element by sliding the reciprocal mating element at least partially along the protrusions and through the opposed recesses.

2. The battery cover of claim 1, wherein the cover mating element further includes a first portion, a second portion, and a pocket portion defined between the first and second portions.

3. The battery cover of claim 2, wherein the pocket portion is operable to receive a catch associated with the reciprocal mating element to couple the cover mating element thereto.

4. The battery cover of claim 2, wherein the second portion is hingedly coupled with the first portion such that the second portion may pivot about the first portion to define the pocket portion.

5. The battery cover of claim 4, further comprising a spring to bias the second portion.

6. A battery cover for an electronic device including a battery receptacle, the battery cover comprising:
    a base operable to couple with a portion of the electronic device and at least partially cover the battery receptacle; and
    a cover mating element including—
        a first portion,
        a second portion hingedly coupled with the first portion such that the second portion may pivot about the first portion to define a pocket portion, and
        a pair of opposed protrusions extending outwardly away from a longitudinal axis of the first portion;
    wherein the cover mating element is positioned on the base to define opposed recesses between the base and each of the protrusions; and
    wherein the cover mating element is operable to be slidably coupled with a reciprocal mating element by sliding the reciprocal mating element at least partially along the protrusions and through the opposed recesses.

7. The battery cover of claim 6, wherein the pocket portion is operable to receive a catch associated with the reciprocal mating element to couple the cover mating element thereto.

8. A battery cover for an electronic device including a battery receptacle, the battery cover comprising:
    a base operable to couple with a portion of the electronic device and at least partially cover the battery receptacle, the base including a rear portion including a top and a gap formed within the top; and
    a cover mating element including—
        a first portion positioned within the gap such that a top of the first portion is flush with the top of the rear portion of the base,
        a second portion hingedly coupled with the first portion such that the second portion may pivot about the first portion to define a pocket portion, and
        a pair of opposed protrusions extending outwardly away from a longitudinal axis of the first portion, wherein the protrusions define opposed recesses between the base and each of the protrusions;
    wherein the cover mating element is operable to be slidably coupled with a reciprocal mating element by sliding the reciprocal mating element at least partially along the protrusions and through the opposed recesses.

9. The battery cover of claim 8, wherein the pocket portion is operable to receive a catch associated with the reciprocal mating element to couple the cover mating element thereto.

* * * * *